July 12, 1932.　　　J. J. McCARTHY　　　1,867,227

SPEED CHANGING TRANSMISSION MECHANISM

Filed Nov. 27, 1929　　　3 Sheets-Sheet 1

Inventor
John J. McCarthy
by James R. Hodda
Attorney

July 12, 1932. J. J. McCARTHY 1,867,227
SPEED CHANGING TRANSMISSION MECHANISM
Filed Nov. 27, 1929 3 Sheets-Sheet 2

Inventor
John J. McCarthy
by James R. Hodder
Attorney

July 12, 1932.  J. J. McCARTHY  1,867,227
SPEED CHANGING TRANSMISSION MECHANISM
Filed Nov. 27, 1929   3 Sheets-Sheet 3

Inventor
John J. McCarthy
by James R. Howitt
Attorney

Patented July 12, 1932

1,867,227

UNITED STATES PATENT OFFICE

JOHN J. McCARTHY, OF MALDEN, MASSACHUSETTS

SPEED CHANGING TRANSMISSION MECHANISM

Application filed November 27, 1929. Serial No. 410,070.

My present invention relates to power transmitting mechanism, and more particularly to a speed changing transmission mechanism.

Speed changing transmission mechanisms are in universal use in motor driven vehicles for the purpose of obtaining different rates of speed of a driven shaft from a practically constant speed driven engine. Such mechanisms, however, are relatively inflexible in that the number of changes of speed is strictly limited and in order to obtain the proper variations of speed it is necessary to vary continuously and continually the speed of the engine itself. Further, such speed changing devices are such that considerable skill is required to obtain the necessary changes of speed without injury to the mechanism itself.

In my present invention I have designed an improved power transmitting mechanism whereby the power transmission will be gradually put through all variations in speed and without shock or jar. In carrying out my invention I utilize a plurality of pistons attached to the motor shaft, the method of attachment being such that the pistons have imparted thereto an axial movement as well as a rotary movement in the surface of the cylinder concentrically with the axis of the engine shaft. Associated with such pistons are cylinders arranged in a driven member, such cylinders connecting with a reservoir for a liquid, preferably a heavy liquid, such as oil. Means is provided that is associated with each cylinder for determining the rate of flow of the liquid from the cylinders to the central reservoir and vice versa, and the pistons in the cylinders act as means for pumping the oil not only from the cylinder itself into the reservoir but also act as a means for pumping oil out of the reservoir into one or more of the other cylinders.

Also associated with the driven member is a propeller shaft, this propeller shaft being in axial alignment with the driven member and means is associated therewith for driving the propeller shaft at the same speed as the driven member or at a different rate of speed therefrom.

The principal object of my invention, therefore, is an improved power transmitting mechanism.

Another object of my invention is an improved speed changing transmission mechanism.

Other objects and novel features of the construction and arrangement of parts comprising the device will appear as the description of the invention progresses.

In the accompanying drawings illustrating a preferred embodiment of my invention, Fig. 1 is a central sectional elevation;

Figure 1:
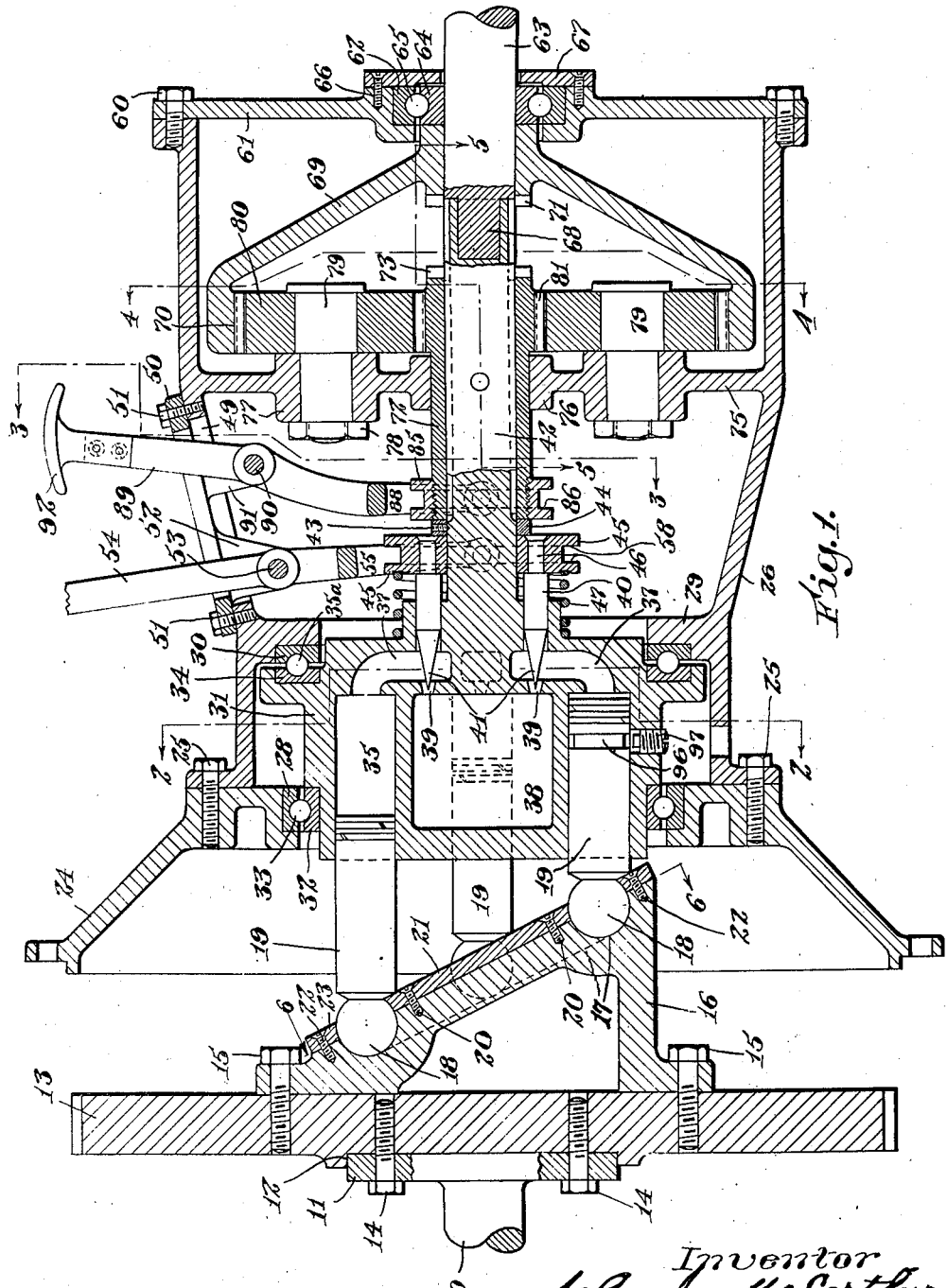
Figure 2:
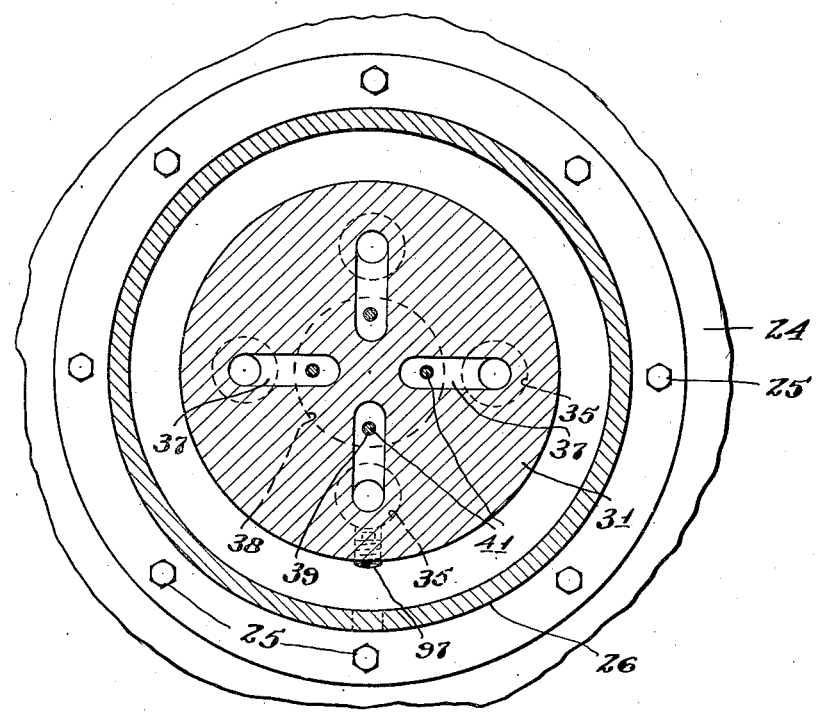
Fig. 2 is a section on the line 2—2 of Fig. 1.
Figure 5:
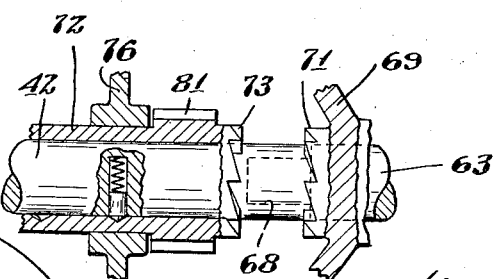
Fig. 5 is a section on the line 5—5 of Fig. 1.
Figure 6:
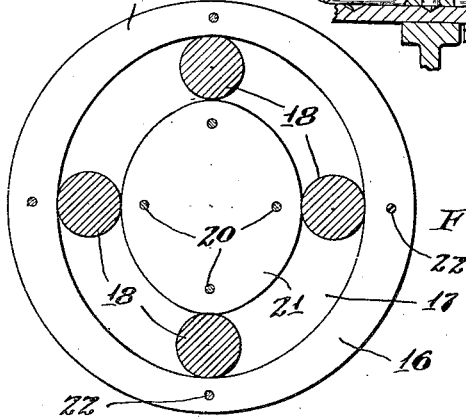
Fig. 6 is a section on the line 6—6 of Fig. 1.
Figure 4:
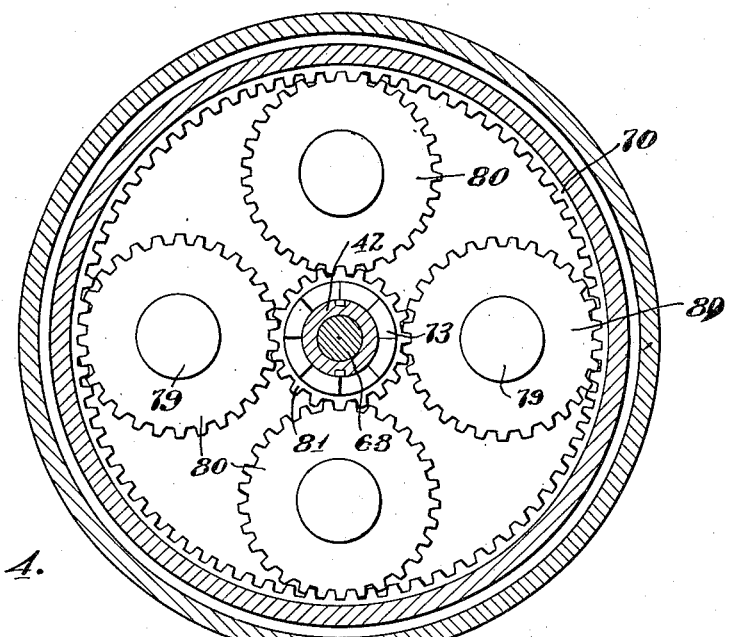
Fig. 4 is a section on the line 4—4 of Fig. 1.
Figure 3:
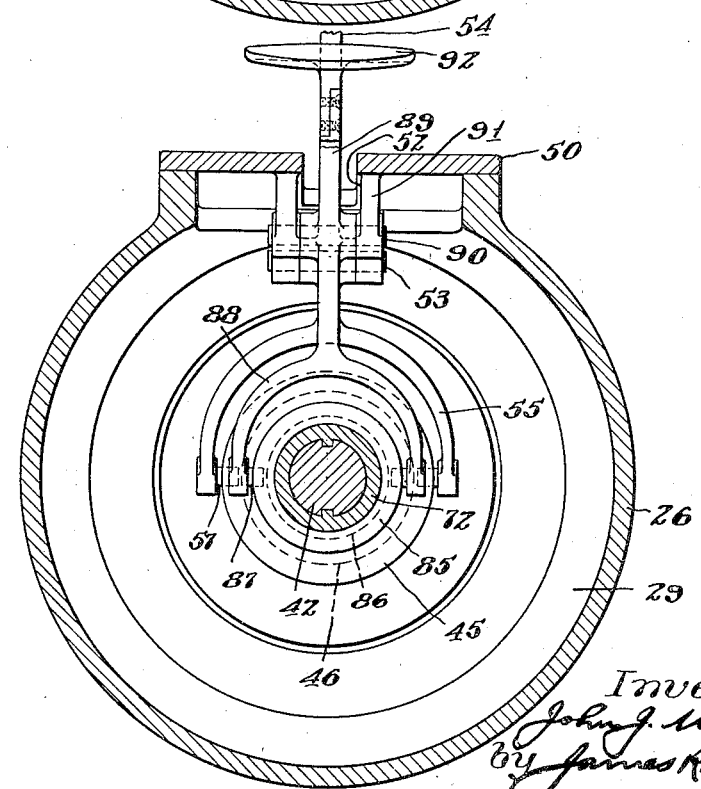
Fig. 3 is a section on the line 3—3 of Fig. 1.

Referring to the drawings 10 designates the usual crank shaft of a prime mover, such as an engine (not shown), such shaft being provided on its rear end with a flange 11 fitting into a recess 12 in the usual fly wheel 13. Bolts 14 are utilized to secure the fly wheel 13 to the flange 11. Secured to the rear face of the fly wheel 13 by the bolts 15 is a member 16 designated preferably as a wabble disc, such disc having the rear face lying at any suitable angle to the horizontal, and as shown in the drawings, such angle is approximately sixty degrees although it should be understood that the degree of such angle is relatively unimportant. Formed on the rear face of the wabble disc 16 is an annular groove 17 and fitting into such groove 17 are ball shaped ends 18 of a plurality of pistons 19. Secured to the rear face of the wabble disc 16 by screws 20 is a central plate 21. Also secured to the rear face of the wabble disc 16 by screws 22 is an outer ring 23. The central plate 21 and the outer ring 23 constitute at the outer surface and inner surface respectively a groove that is narrower than the greatest diameter of the balls 18 and therefore act as means for maintaining the balls 18 in the annular groove 17 in the wabble disc. 24 designates a casing secured in the usual way to the engine (not shown) and secured to the rear face of the casing by bolts 25 is a rearwardly extending casing 26.

Formed in the casing 24 is a central opening and arranged in such opening in the body of the casing 24 is a ball race 28. Arranged in the casing 26 and intermediate the ends thereof is an inwardly extending central web 29 and arranged in the front face thereof is a ball race 30.

31 designates a cylindrical member having secured to its front end a ball race 32 that co-operates with the ball race 28 and between the ball races 28 and 32 are anti-friction balls 33. Secured to the rear face of the member 31 is a ball-race 34 that co-operates with the ball race 30 and co-operating with the ball races 30 and 34 are anti-friction balls 35a. It will thus be obvious that the member 31 is freely rotatable within the casings 24 and 26 and that the axis of rotation thereof is coincident with the axis of rotation of the crank shaft 10. Symmetrically arranged about the axis of the member 31 is a plurality of cylinders 35, and while the number of such cylinders may be any desired, I find four of be a satisfactory number and have, therefore, illustrated such a number in the drawings. There are, therefore, four pistons 19 and such pistons are slidably mounted in the cylinders 35. At the rear end of the cylinders 35 and within the body of the member 31 are formed passages 37, there being thus one such passage 37 for each of the cylinders 35 and associated with the plurality of passages 37 is a reservoir 38 that is formed within the body of the member 31. Connecting each passage 37 with the reservoir 38 is a passage 39, a valve seat being formed by said passages. Within the reservoir 38 and within a portion of the cylinders 35 is placed a liquid, preferably a relatively heavy oil, although any liquid may be utilized. If the crank shaft 10 is rotated there is produced a corresponding rotation of the wabble disc 16 and, therefore, there will be imparted to the pistons 19 an axial movement into and out of the cylinders 35.

Under these circumstances, and as so far described, there will be no tendency to rotation on the part of the member 31 because of the fact that the pistons 19 will pump the fluid through the passages 37, passages 39, into the reservoir 38 and out through the passages 39, passages 37 and into the cylinders 35. There will, therefore, be merely a pumping of the fluid within the cylinders 35 and reservoir 38. The rear wall of the member 31 is drilled symmetrically about its axis to form bearings for a plurality of valve stems 40, each such valve stem being provided on its forward end with a taper valve 41 which engages with the valve seat formed by the passage 39. Formed integral with the member 31 and extending rearwardly therefrom and axially thereof is a shaft 42. Secured to the shaft 42 by screw 43 is a collar 44 and between the collar 44 and the rear face of the member 31 is slidably mouned a collar 45.

The rear ends of the valve stems 40 are reduced in diameter, as indicated at 46, and extend through perforations in the collar 45, the ends of such reduced portions 46 being riveted, as shown, so as to have the valve stem 40 rigidly attached to the collar 45 and extending forwardly therefrom. Between the front face of the collar 45 and the rear face of the member 31 is a coil spring 47 which tends to force the collar rearwardly, as viewed in Fig. 1, into engagement with the front face of the collar 44. Under these circumstances, therefore, the valves 41 will be in such position as to leave the passages 39 entirely open. Formed in the upper surface of the casing 26 is an opening 49, this opening being closed by a cover plate 50 secured thereto by screws 51.

Formed integral with the cover plate 50 and extending downwardly from the under surface thereof are spaced lugs 52, in which is secured a shaft 53 and on which shaft is rotatably mounted a lever 54. The lower end of the lever 54 is bifurcated, as indicated at 55, and at the end of the bifurcation are arranged inwardly extending pins 57 that extend into an annular groove 58 formed in the periphery of the collar 45. By properly manipulating the lever 54 therefore it will be obvious that the collar 45 may be moved forwardly or to the left, as viewed in Fig. 1, against the tension of the spring 47, thus bringing the valves 41 into association with the passages 39 to control the flow of liquid from the passages 37 into the reservoir 38 and vice versa. As the valves 41 are moved to the left, as shown in Fig. 1, so as to reduce the available opening through the passages 39, it will be obvious that if the crank shaft 10 is still rotating under these conditions that the pistons 19 in the cylinders 35 will experience difficulty in not only forcing liquid from the cylinders 35 into the reservoir 38, but will also experience difficulty in withdrawing liquid from the reservoir 38 into the cylinders 35. Under these circumstances, therefore, there will be imparted to the member 31 a rotary movement, the ratio of the rotary movement of 31 with respect to the crank shaft 10 depending on the amount of flow of the liquid from and to the cylinders 35 and reservoir 38 respectively, and when the valves 41 are completely seated in the passages 39 so as to positively prevent a flow of fluid, the member 31 will rotate at the same speed as the crank shaft 10.

Secured to the rear end of the casing 26 by bolts 60 is a cover plate 61, this cover plate having formed therein at its central portion a race in which is fitted a ball race 62. Extending through the cover plate 61 is the end of the propeller or drive shaft 63 and on the drive shaft is arranged a ball race 64 that is associated with the ball race 62 and between the ball races 62 and 64 are arranged anti-friction balls 65. Secured to the rear face of the cover plate 61 by screws 66 is a cover plate 67. The rear end of the shaft 42 is drilled to receive the reduced forward end 68 of the propeller or drive shaft 63. Secured to the drive shaft 63 adjacent its forward end, as by keying or otherwise, is a dish-shaped member 69, which extends forwardly or to the left, as shown in Fig. 1, and has provided on its forward end an internal gear 70. Formed on the forward or left hand end of the hub of the member 69 are ratchet teeth 71. Slidably mounted on the shaft 42 but prevented from rotation with respect thereto is a sleeve 72, such sleeve having at its rear or right hand end ratchet teeth 73, which are adapted to engage with the ratchet teeth on the hub of the member 69. It will be obvious, therefore, that if the sleeve 72 is moved to the right on the shaft 42 as viewed in Fig. 1, so as to bring the ratchet teeth 71 and 73 into engagement with each other, that the propeller or drive shaft 63 will be rotated simultaneously with and at the same speed as the shaft 42.

Formed in the casing 26 intermediate the end thereof is a central web 75 provided with a central bearing 76 in which is rotatably mounted the sleeve 72. Formed in the central web 75 and symmetrically arranged about the bearing 76 are hubs 77, there being in the preferred embodiment of the invention four such hubs and in each of such hubs is secured, by nuts 78, rearwardly extending stub shafts 79 and on each of such stub shafts 79 is rotatably mounted pinions 80, which pinions mesh with the internal gear 70 on the member 69. Formed on the rear end of the sleeve 72 adjacent the ratchet teeth 73 is a pinion 81, which pinion meshes with all of the pinions 80. The internal gear 70, the pinions 80 and the pinion 81 constitute a reverse mechanism and as the members are shown in Fig. 1, such reverse mechanism is in operative condition so that assuming the direction of rotation of the crank shaft 10 and the shaft 42 to be right handed, as viewed from the left hand end of Fig. 1, the driving power for the propeller or drive shaft 63 is through the pinion 81, pinions 80, internal gear 70 and member 69 and, therefore, the direction of rotation of the propeller or drive shaft 63 will be left hand, as viewed under the the same conditions.

Formed on the forward or left hand end of the sleeve 72 are threads which engage with corresponding internal threads on a collar 85, this collar having formed on its periphery an annular groove 86 in which extend pins 87 secured to the ends of a bifurcated member 88 formed on the lower end of the lever 89. This lever 89 is rotatably mounted on a shaft 90 secured in spaced and downwardly extending lugs 91 formed integral with the cover plate 50.

Secured to the upper end of the lever 89 is a kick plate 92 and by means of which the lever 89 may be rotated on its shaft 90 to move the sleeve 72 to its extreme right hand position or to the extreme left hand position, as shown in Fig. 1.

By controlling the lever 54 so as to, in turn, control the operation of the valve stems 41, the rate of flow of the liquid between the cylinders 35 and central reservoir 38 is controlled so as to vary at will the difference in the rate of rotation between the crank shaft 10 and the rotary member 31. It may sometimes happen that a leakage of the liquid within the cylinders 35 and reservoir 38 will take place and cannot be controlled, and under these circumstances it will ordinarily be impossible to operate the vehicle to which the device is attached. To provide against such contingency I have arranged one of the pistons 19 with an annular groove 96 therein and extending through the wall of the member 31 is a set screw 97, the inner end of which is reduced in diameter to fit into the annular groove 96. By screwing the set screw 97 into the annular groove 96, the pistons 19 are locked against reciprocating movement within the cylinders 35 and, therefore, there will always be a driving connection between the crank shaft 10 and the member 31.

Having thus described my invention, what I claim as new is:

1. In a device of the kind described, the combination of a driving element, a plurality of pistons connected thereto, a driven element, a plurality of cylinders in said driven element for engaging said pistons, a source of fluid supply connected to said cylinders, means for controlling the flow of fluid to and from the cylinders, and means operable to engage one of said pistons to prevent reciprocation of all said pistons.

2. In a device of the kind described, the combination of a driving element, including a wabble disc having an annular cam track formed in one face thereof, a plurality of pistons symmetrically arranged about the face thereof and lying parallel to each other and to the axis of the driving element, a driven element, and a plurality of cylinders formed in one end of the driven element and symmetrically arranged about the end face thereof and lying parallel to each other and to the axis of the driven element, said pistons being located in said cylinders, a reservoir communicating with said cylinders and together with said cylinders forming a confining space for liquids, rotary movement of said driving element causing reciprocating movement of said pistons, and means operable to engage one of said pistons to prevent reciprocation of all said pistons.

3. In a device of the kind described, the combination of a driving element, a plurality of pistons symmetrically arranged about the axis of rotation thereof, means for imparting a reciprocatory motion to said pistons, a driven member associated with said pistons, a source of fluid supply in said member, separate controlling means for controlling the rate of flow of the fluid from the source of fluid supply for each of said pistons, means slidably mounted on the driven member for operating the separate controlling means simultaneously, and means operable to engage one of said pistons to prevent reciprocation of all said pistons.

4. In a device of the kind described, the combination of a driving element, a plurality of pistons connected thereto, a driven element, a plurality of cylinders in said driven element for engaging said pistons, a source of fluid supply connected to said cylinders, means for controlling the flow of fluid to and from the cylinders, one of said pistons having an annular groove therein, and means manually operable to engage said groove and prevent reciprocation of said piston and of the other pistons.

5. In a device of the kind described, the combination of a driving element, a plurality of pistons connected thereto, a driven element, a plurality of cylinders in said driven element for engaging said pistons, a source of fluid supply connected to said cylinders, means for controlling the flow of fluid to and from the cylinders, one of said pistons having an annular groove therein, and a set screw located in the wall of one of said cylinders and accessible from the exterior of the device and operable at will to engage said groove and prevent reciprocation of said piston and of the other pistons.

In testimony whereof, I have signed my name to this specification.

JOHN J. McCARTHY.